UNITED STATES PATENT OFFICE.

GEORGE P. ROCKWELL, OF BALTIMORE, MARYLAND.

IMPROVEMENT IN MANUFACTURE OF ALUM.

Specification forming part of Letters Patent No. 196,043, dated October 9, 1877; application filed September 24, 1877.

*To all whom it may concern:*

Be it known that I, GEORGE P. ROCKWELL, of the city of Baltimore, in the State of Maryland, have invented a new and useful Improvement in the Manufacture of Alum, of which I do hereby declare the following to be a full, clear, and exact description.

My invention relates, in general, to that special division of the various modes of alum-manufacture in which alum, sulphate of alumina, and other aluminous compounds are made from such materials as contain, principally, alumina as a source of alum, and to which, consequently, sulphuric acid and alkaline salts have to be added, but has especial reference to that subdivision of the above class in which the mineral or earth employed has heretofore been shales or common clay.

For a fuller comprehension of my improvement it becomes necessary to set forth and contrast with the same the processes and materials heretofore in use in such subdivision of the manufacture.

In the class of manufacture of aluminous compounds to which my invention relates it is a prerequisite that some source of alumina be had which is, as nearly as may be, uncontaminated by impurities, such as carbonate of lime or iron, which tend to impair the resultant product, and wherein the alumina exists in a condition to be readily dissolved by sulphuric acid.

Heretofore, while such materials as cryolite, bauxite, and aluminous shales have been employed, clay has been chiefly resorted to as the most desirable source of alumina.

Clay is a compound of silica and alumina, (forming silicate of alumina,) attended with more or less impurities.

The clays so called above are believed to have been of igneous origin.

It is a well-known property of alumina that if exposed to a high heat it becomes difficult, if not almost impossible, of solution in sulphuric acid. The alumina, then, of clay, having undoubtedly at some geologic period been exposed to a very high temperature, is to-day found to be so deficient in the requisite solubility as to cause its use in alum-manufacture to be attended with tedious and costly processes to obtain it in solution, as well as free it from the impurities common to it.

The process of making alum from clay consists, essentially, of the following steps, viz: Roasting of the clay, digestion with excess of sulphuric acid, dilution of the solution, separation of silica, evaporation, final addition of alkaline equivalent, and recrystallization.

It is clearly obvious that a process such as that described, being tedious and requiring the use of much apparatus, is costly, while it is attended with considerable loss of alum product, for the reason that, owing to the insolubility of clay, only about one-half its alumina is obtained in the form of alum; also, a large portion of the liquid in the crystalline solutions aforesaid does not at first crystallize, (being known as the "mother-liquors,") and will only further crystallize after being drained from the crystals first formed and again concentrated by heat; while, finally, much of the mother-liquors, although rich in alum, must be allowed to run to waste, because the impurities from the clay accumulate in them, and cannot be removed without great difficulty and cost.

My invention has for its object the removal or lessening of the objections just recited to the manufacture of alum from clay.

I have discovered that alum and aluminous compounds can be more cheaply and advantageously manufactured, in the manner hereinafter set forth, by the employment, as a source of alumina, of a material never heretofore used for such purpose—to wit, the mineral Indianaite, which is a comparatively pure and readily-soluble silicate of alumina. It is of approximately the following composition, as set forth in the annexed analyses:

|  | A | B | C | D |
|---|---|---|---|---|
| Silica | 45.90 | 47.05 | 47.13 | 42.28 |
| Alumina | 40.34 | 37.14 | 36.76 | 43.05 |
| Water | 13.26 | 15.55 | 15.13 | 14.66 |
| Lime and magnesia | Trace | .03 | .04 | Trace |
| Oxide of iron |  | Trace | Trace |  |
| Manganese |  |  | .03 | Trace |

[See p. 306, vol. 10, American Journal of Science and Arts, 1875.]

This mineral undoubtedly results from decomposition by aqueous action, to which origin may be attributed its wonderful solubility in sulphuric acid. Its peculiar fitness for alum-manufacture is witnessed by the fact that the alumina present in it may be extracted by treatment even with cold sulphuric acid, the quantity required being but about the acid equivalent to the alumina present; clay, on the contrary, requiring the sulphuric acid in large excess.

Heretofore, in the manufacture of alum from kaolins, the application of heat to effect solution has been an indispensable requisite, while in my process, as stated, it may be omitted.

The Indianaite is also practically free from iron and the other objectionable impurities found in clay.

This mineral is not to be confounded with the anorthites or silicates of alumina and lime, of which one variety is termed "Indianite," from the fact that it is abundantly found in India. Indianaite may readily be distinguished by its composition, being a practically pure silicate of alumina, by its fracture and adhesion to the tongue.

A process convenient for the production of alum from Indianaite is the following: First, mix the desired quantity of Indianaite with about the equivalent of sulphuric acid (preferably at about 40° Baumé) to the alumina present. When the reaction of the above admixture has become complete, add sufficient water.

Instead of adding water, as above stated, it may be permitted to harden, and then be treated with water; or the crude cake so formed may be directly sent into commerce.

By this means sulphate of alumina is obtained in solutions, the insoluble silica settling to the bottom. If the above steps of my process have been gone through with carefully, the solution of sulphate of alumina just above mentioned will be of such strength as to require little or no boiling in order to readily crystallize when sulphate of ammonia or potash has been added.

Owing to the pureness of the solution obtained, it is evident that there results little or no impure mother-liquors to recrystallize or to run to waste and cause loss.

It is obvious that the Indianaite may be applied with equal advantage in the manufacture of other aluminous compounds used in the arts and trades, such as sulphate alumina, alum-cake, &c.

Having thus described my invention, I claim and desire to secure by Letters Patent of the United States—

1. The process herein described for the manufacture of aluminic sulphate, the same consisting in the decomposition of the mineral Indianaite by means of sulphuric acid, elimination of separated silica, and crystallization, substantially as set forth.

2. The process herein described for the manufacture of alum, the same consisting in the decomposition of the mineral Indianaite by means of sulphuric acid, elimination of separated silica, addition of the equivalent of alkali, and final crystallization, all substantially as set forth.

GEORGE P. ROCKWELL.

Witnesses:
 CONRAD SEMPER,
 W. W. DOUGHERTY.